(12) United States Patent
Sakakibara

(10) Patent No.: US 10,556,468 B2
(45) Date of Patent: Feb. 11, 2020

(54) PNEUMATIC TIRE AND METHOD OF MANUFACTURING PNEUMATIC TIRE

(71) Applicant: TOYO TIRE & RUBBER CO., LTD., Osaka-shi, Osaka (JP)

(72) Inventor: Kazuhiro Sakakibara, Osaka (JP)

(73) Assignee: Toyo Tire Corporation, Itami-shi (JP)

( * ) Notice: Subject to any disclaimer, the term of this patent is extended or adjusted under 35 U.S.C. 154(b) by 364 days.

(21) Appl. No.: 15/498,975

(22) Filed: Apr. 27, 2017

(65) Prior Publication Data

US 2017/0326923 A1 Nov. 16, 2017

(30) Foreign Application Priority Data

May 13, 2016 (JP) .................. 2016-096903

(51) Int. Cl.
*B60C 19/00* (2006.01)
*B29D 30/00* (2006.01)

(52) U.S. Cl.
CPC ........ *B60C 19/002* (2013.01); *B29D 30/0061* (2013.01); *B29D 2030/0072* (2013.01)

(58) Field of Classification Search
CPC ..... B60C 19/00; B60C 19/002; B60C 19/003; B60C 19/12; B60C 19/122; B29D 30/0061; B29D 2030/0072; B29D 2030/0077; B29D 2030/0083
See application file for complete search history.

(56) References Cited

U.S. PATENT DOCUMENTS

| 2009/0038726 A1 | 2/2009 | Yukawa |
| 2016/0031269 A1 | 2/2016 | Sakakibara |
| 2016/0137010 A1 | 5/2016 | Sakakibara |

FOREIGN PATENT DOCUMENTS

| CN | 105599548 A | 5/2016 |
| JP | 5-294102 A | 11/1993 |
| JP | 7-117404 A | 5/1995 |
| JP | 2006-306302 A | 11/2006 |

OTHER PUBLICATIONS

Extended European Search Report dated Oct. 20, 2017, issued in counterpart European Application No. 17168373.3. (8 pages).
Office Action dated Nov. 20, 2018, issued in counterpart Chinese Application No. 201710244792.0, with English translation. (14 pages).

*Primary Examiner* — Justin R Fischer
(74) *Attorney, Agent, or Firm* — Westerman, Hattori, Daniels & Adrian, LLP

(57) ABSTRACT

A pneumatic tire includes two plate-like members which have a plurality of through holes formed therein, and are adhered to each other by adhesion portions at least at two positions spaced apart from each other, and a supporting member which is inserted between the two plate-like members between the adhesion portions being adjacent to each other, wherein a part of an outer surface of one of the two plate-like members is attached to an inner surface of a tread portion so that a space is formed between the outer surface of the one of the two plate-like members that are adhered and the inner surface of the tread portion.

9 Claims, 8 Drawing Sheets

PNEUMATIC TIRE AND METHOD OF MANUFACTURING PNEUMATIC TIRE

BACKGROUND OF THE INVENTION

Field of the Invention

The present invention relates to a pneumatic tire which can reduce a cavity resonance noise by attaching a plate-like member to an inner surface of a tread portion, and a method of manufacturing the pneumatic tire.

Description of the Related Art

When the vehicle travels on a rough road surface or climbs over a joint of the road surface, a sound called as a road noise may be generated within the vehicle. The road noise is one of the sound with which a tire is involved. In the case that the tire is vibrated by an input caused by irregularity on the road surface, a cavity resonance noise is excited in an internal portion of the tire by the oscillation, and the sound is caused within the vehicle.

Patent document 1 describes a pneumatic tire in which a sound control material made of a sponge material is disposed in a tire inner cavity which is surrounded by a rim and the pneumatic tire, for reducing the road noise. However, there is the possibility that the sponge material mentioned above causes increase in the weight of a whole tire, resulting in a lowered fuel efficiency. Further, there is a problem that a cost increase is caused since a lot of sponge material is required.

Patent document 2 describes a pneumatic tire in which a partition wall comparting an air chamber in a circumferential direction is provided within the air chamber, which is formed between a tire inner peripheral surface and a rim outer peripheral surface, for the purpose of preventing increase in the road noise while suppressing a great cost increase. An equivalent length of an air column within the air chamber becomes short by comparting the air chamber in the circumferential direction by the partition wall, and it is possible to shift a resonant frequency of an air column resonance. As a result, it is possible to prevent the road noise from being increased by the air column resonance.

Further, patent document 3 describes a pneumatic tire in which an inner wall of the tire is provided with a thin elastic divider plate extending approximately in an axial direction within the tire inner cavity, for the purpose of reducing the load noise which is caused by the cavity resonance noise, while suppressing the increase of the weight. A sound pressure mode is changed in a whole of the tire inner cavity by the provision of the elastic divider plate within the tire inner cavity, and an in-vehicle sound level is reduced.

However, the partition wall and the divider plate oscillate themselves and may increase the road noise caused by the cavity resonance noise by serving a new sound source.

PRIOR ART DOCUMENT

Patent Document

Patent Document 1: JP-A-2006-306302
Patent Document 2: JP-A-7-117404
Patent Document 3: JP-A-5-294102

SUMMARY OF THE INVENTION

Accordingly, an object of the present invention is to provide a pneumatic tire which can reduce a cavity resonance noise while suppressing weight increase and cost increase, and a method of manufacturing the pneumatic tire.

The object can be achieved by the following present invention. That is, the present invention provides a pneumatic tire including two plate-like members which have a plurality of through holes formed therein, and are adhered to each other by adhesion portions at least at two positions spaced apart from each other, and a supporting member which is inserted between the two plate-like members between the adhesion portions being adjacent to each other, wherein a part of an outer surface of one of the two plate-like members is attached to an inner surface of a tread portion so that a space is formed between the outer surface of the one of the two plate-like members that are adhered and the inner surface of the tread portion.

In the pneumatic tire according to the present invention, two plate-like members having a plurality of through holes formed therein are attached to the inner surface of the tread portion. More specifically, the two plate-like members are adhered to each other by the adhesion portions at least at two positions which are spaced apart from each other, and a part of the outer surface of one of the two plate-like members is attached to the inner surface of the tread portion so that a space is formed between the outer surface of the one of the two plate-like members and the inner surface of the tread portion. As a result, a plurality of through holes is formed in the two plate-like members which are in a floating state from the inner surface of the tread portion. In general, when the sound passes through the through hole, there are generated the viscous damping caused by the friction between the air and the inner wall surface of the through hole, and the pressure loss damping caused by the vortex generated by the passing. Therefore, the sound is damped. As a result, the sound within the tire passes through the through hole by attaching the plate-like member having the through holes formed therein to the inner surface of the tread portion, whereby it is possible to damp and reduce the cavity resonance noise. Further, since it is not necessary to provide a lot of noise absorbing material and sound control material such as sponge material, it is possible to suppress increase of the weight and increase of the cost. Further, in the present invention, since the supporting member is inserted between the two plate-like members between the adjacent adhesion portions, it is possible to prevent a situation where the plate-like member is crushed against the inner surface of the tread portion due to the centrifugal force in association with the rotation of the tire and, thereby, the through holes are closed. As a result, it is possible to damp and reduce the cavity resonance noise not only at a low speed to a middle speed, but also at a high speed.

In the pneumatic tire according to the present invention, the adhesion portions at the two positions may be arranged along a tire circumferential direction.

According to the structure, since the air flow in the tire circumferential direction generated within the tire easily passes through the through holes, it is possible to effectively reduce the cavity resonance noise.

In the pneumatic tire according to the present invention, the outer surface of the one of the two plate-like members may be attached to the inner surface of the tread portion in a portion which is closer to an outer side than to the adhesion portions at the two positions.

According to the structure, the space tends to be formed between the plate-like member facing to the inner surface of the tread portion among the two plate-like members and the inner surface of the tread portion, and it is possible to effectively reduce the cavity resonance noise by the through hole.

In the pneumatic tire according to the present invention, the two plate-like members may be adhered to each other at the adhesion portions at three or more positions which are spaced apart from one another at uniform intervals, and the supporting members may be respectively inserted between the two plate-like members between the adjacent adhesion portions, and the two plate-like members may be attached to the inner surface of the tread portion over its whole periphery.

According to the structure, since the two plate-like members are attached to the inner surface of the tread portion over a whole periphery, it is possible to effectively reduce the cavity resonance noise by the through hole. Further, it is possible to suppress deterioration of the uniformity and the weight balance by arranging the supporting members at uniform intervals over a whole periphery in the tire circumferential direction.

Further the present invention provides a method of manufacturing a pneumatic tire, the method including an adhesion step of adhering two plate-like members, which are overlapped, to each other by adhesion portions at least at two positions which are spaced apart from each other, a punching step of forming a plurality of through holes in the two plate-like members, an insertion step of inserting a supporting member between the two plate-like members between the adjacent adhesion portions, and an attachment step of attaching a part of an outer surface of one of the two plate-like members to an inner surface of a tread portion so that a space is formed between the outer surface of the one of the adhered two plate-like members and the inner surface of the tread portion.

In the pneumatic tire manufactured by the manufacturing method according to the present invention, two plate-like members having a plurality of through holes formed therein are attached to the inner surface of the tread portion. More specifically, the two plate-like members are adhered to each other by the adhesion portions at least two positions which are spaced apart from each other, and a part of the outer surface of one of the two plate-like members is attached to the inner surface of the tread portion so that a space is formed between the outer surface of one of the adhered two plate-like members and the inner surface of the tread portion. As a result, a plurality of through holes is formed in the two plate-like members which are in a floating state from the inner surface of the tread portion. In general, when the sound passes through the through hole, there are generated the viscous damping caused by the friction between the air and the inner wall surface of the through hole, and the pressure loss damping caused by the vortex generated by the passing. Therefore, the sound is damped. As a result, the sound within the tire passes through the through hole by attaching the plate-like member having the through holes formed therein to the inner surface of the tread portion, whereby it is possible to damp and reduce the cavity resonance noise. Further, since it is not necessary to provide a lot of noise absorbing material and sound control material such as sponge material, it is possible to suppress increase of the weight and increase of the cost. Further, in the pneumatic tire manufactured by the manufacturing method according to the present invention, since the supporting member is inserted between the two plate-like members between the adjacent adhesion portions, it is possible to prevent a situation where the plate-like members is crushed against the inner surface of the tread portion due to the centrifugal force in association with the rotation of the tire and, thereby, the through holes are closed. As a result, it is possible to damp and reduce the cavity resonance noise not only at a low speed to a middle speed, but also at a high speed.

In the method of manufacturing a pneumatic tire according to the present invention, the adhesion step may be carried out before the punching step.

According to the structure, since the through holes can be formed simultaneously in the two plate-like members which are overlapped, it is possible to easily form a plurality of through holes.

In the method of manufacturing a pneumatic tire according to the present invention, the two plate-like members may be two long plate-like members which are supplied continuously, the two plate-like members may be adhered to each other by the adhesion portions at three or more positions which are spaced apart from one another in a longitudinal direction, in the adhesion step, the supporting members may be inserted respectively between the two plate-like members between the adhesion portions which are adjacent to each other, in the insertion step, and the adhered two plate-like members may be attached to the inner surface of the tread portion over its whole periphery, in the attachment step.

According to the structure, since the two plate-like members are attached to the inner surface of the tread portion over a whole periphery, it is possible to effectively reduce the cavity resonance noise by the through hole. Further, it is possible to suppress deterioration of the uniformity and the weight balance by arranging the supporting members at uniform intervals over a whole periphery in the tire circumferential direction.

DETAILED DESCRIPTION OF THE PREFERRED EMBODIMENTS

A description will be given below of embodiments according to the present invention with reference to the accompanying drawings.

First Embodiment

Figure 1:
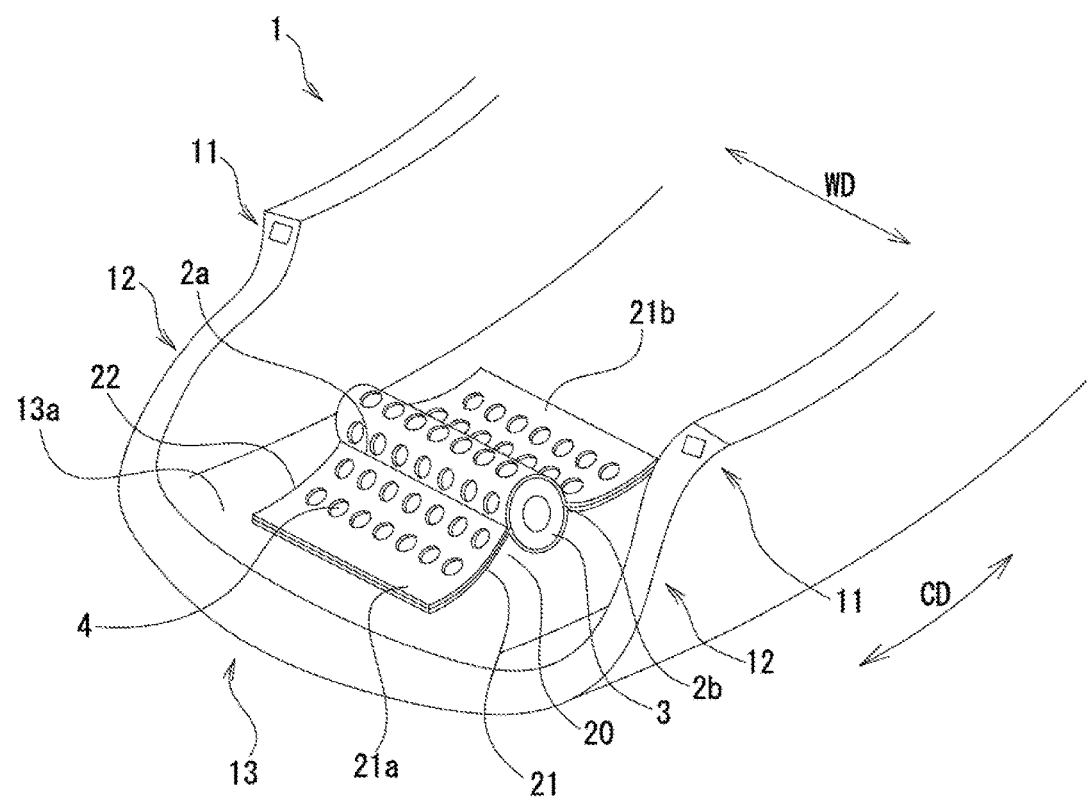
FIG. 1 is a perspective view showing an example of a pneumatic tire according to the present invention.
Figure 2A:
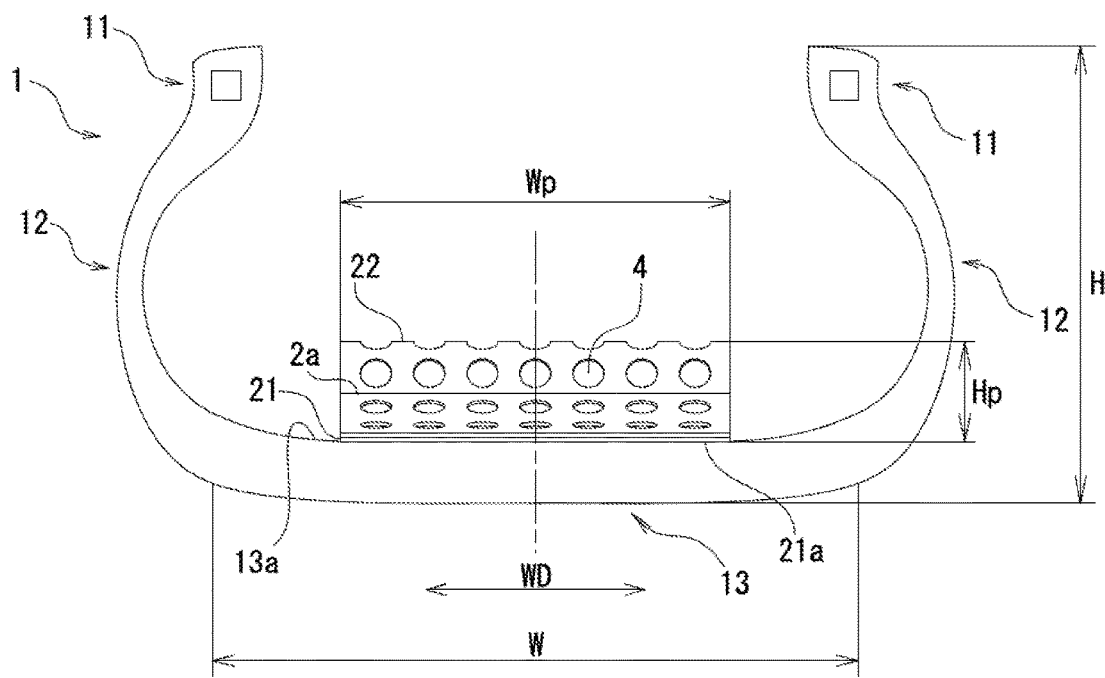
FIG. 2A is a tire meridian cross-sectional view of the pneumatic tire.
Figure 2B:
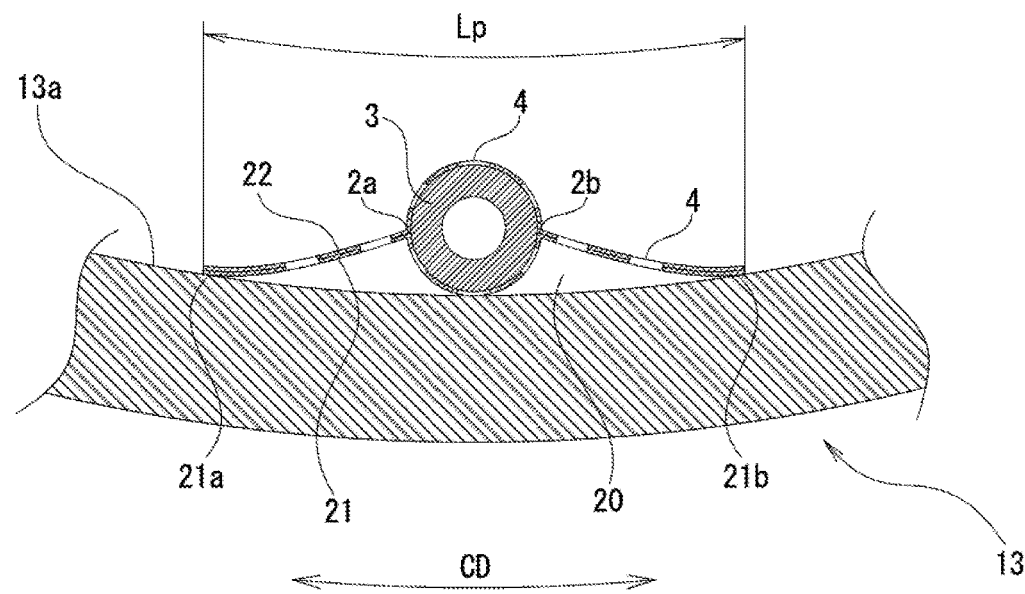
FIG. 2B is a cross-sectional view in a tire circumferential direction of the pneumatic tire.

FIG. 1 is a perspective view showing an example of a pneumatic tire. FIG. 2A is an example of a tire meridian cross-sectional view of the pneumatic tire. FIG. 2B is an example of a cross-sectional view in a tire circumferential direction of the pneumatic tire. Here, reference symbol H denotes a tire cross-sectional height. The tire cross-sectional height H is a height from a nominal rim diameter to a tread surface in a state of being filled with a pneumatic pressure prescribed by JATMA, in a tire meridian cross section.

A pneumatic tire 1 is provided with a pair of annular bead portions 11, side wall portions 12 which extend to outer sides in a tire diametrical direction from each of the bead portions 11, and a tread portion 13 which is connected to outer ends in the tire diametrical direction of each of the side wall portions 12, as shown in FIGS. 1 and 2A.

The pneumatic tire 1 is provided with two plate-like members 21 and 22 which are attached to an inner surface 13a of the tread portion. The two plate-like members 21 and 22 are attached to the inner surface 13a of the tread portion by two mounting portions 21a and 21b which are arranged so as to be spaced apart from each other in a tire circumferential direction CD.

The two plate-like members 21 and 22 are adhered to each other by adhesion portions 2a and 2b at least two positions which are spaced apart from each other. The adhesion portions 2a and 2b at two positions are arranged along a tire circumferential direction CD. The adhesion portions 2a and 2b are adhere by thermal deposition or ultrasonic adhesion. The adhesion portions 2a and 2b extend in a tire width direction WD of the plate-like members 21 and 22.

A support member 3 is inserted between the two plate-like members 21 and 22 between the adhesion portion 2a and the adhesion portion 2b which are adjacent to each other. The supporting member 3 according to the present embodiment is formed into a tubular shape which extends along the tire width direction WD. Details of the supporting member 3 will be described later.

A space 20 is formed between an outer surface of the plate-like member 21 facing to the inner surface 13a of the tread portion among two adhered plate-like members 21 and 22 and the inner surface 13a of the tread portion. In other words, apart of the outer surface of the plate-like member 21 is in non-contact with the inner surface 13a of the tread portion.

The outer surface of the plate-like member 21 is fixed to the inner surface 13a of the tread portion by the mounting portions 21a and 21b. In the present embodiment, the outer surface of the plate-like member 21 positioned in the outer side in the tire diametrical direction of the supporting member 3 is in contact with the inner surface 13a of the tread portion, however, is not fixed to the inner surface 13a of the tread portion. The space 20 is an area which is surrounded by the outer surface of the plate-like member 21 and the inner surface 13a of the tread portion, between the adjacent mounting portions 21a and 21b.

A plurality of through holes 4 is formed in the two plate-like members 21 and 22. The through holes 4 are formed in a whole surface of the two plate-like members 21 and 22. There exist the through holes 4 which are in contact with the supporting member 3, and the through holes 4 which are formed toward the space 20 without being in contact with the supporting member 3.

Here, a description will be given of an effect of damping a cavity resonance noise by the through holes 4. When the sound passes through the through holes 4, the cavity resonance noise is damped by friction between air serving as a medium and an inner wall surface of the through hole 4 (viscous damping). Further, when the sound passes through the through hole 4, the cavity resonance noise is damped by pressure loss caused by a vortex which is generated by the passing (pressure loss damping). As a result, since the sound within the tire passes through the through holes 4 by attaching the plate-like members 21 and 22 having the through holes 4 formed therein to the inner surface 13a of the tread portion, it is possible to damp and reduce the cavity resonance noise.

Further, a particle speed of the air is involved with the viscous damping and the pressure loss damping when the sound passes through the through holes 4. In the case that the through holes 4 are arranged at the positions having the greater particle speed, the cavity resonance noise can be effectively damped. Further, since the air flow is added to the speed, the through holes 4 are preferably arranged in the place having the air flow, in the rotating tire.

Figure 3:
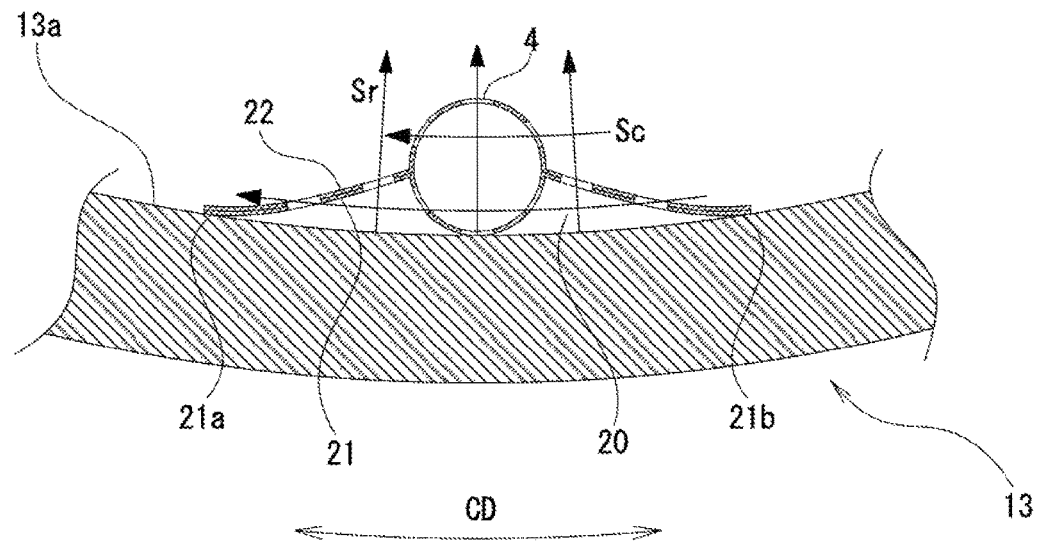
FIG. 3 is an enlarged cross-sectional view showing the plate-like member in an enlarged manner.

FIG. 3 is an enlarged cross-sectional view showing the plate-like members 21 and 22 having the through holes 4 formed therein in an enlarged manner (in this case, the supporting member 3 is not shown). The air flow within the tire is shown by arrows. Within the tire, there exist an air flow Sr in the tire diametrical direction which is generated by deformation of the tire caused by the ground on the road surface, and an air flow Sc in the circumferential direction CD which is generated by restoration of the deformation. Since the sound generated by the input from the road surface and the air flow Sr in the tire diametrical direction pass through the through holes 4 by arranging the plate-like members 21 and 22 so as to cover the inner surface 13a of the tread portion, it is possible to effectively reduce the cavity resonance noise. Further, since the sound transmitted in the tire circumferential direction CD and the air flow Sc in the tire circumferential direction CD pass through the through holes 4 by attaching a part of the outer surface of the plate-like member 21 to the inner surface 13a of the tread portion so that the space 20 is formed between the outer surface of the plate-like member 21 and the inner surface 13a of the tread portion, it is possible to effectively reduce the cavity resonance noise.

Further, the closer to the inner surface 13a of the tread portion the air flow is, the faster the air flow is. Considering the fact, in the present invention, the plate-like members 21 and 22 having the through holes 4 therein are attached to the inner surface 13a of the tread portion.

The supporting member 3 is inserted between the two plate-like members 21 and 22. The plate-like members 21 and 22 are preferably formed with a thinned thickness for suppressing the increase of the weight, however, in the case that the thickness is thinned, the plate-like members 21 and 22 are crushed against the inner surface 13a of the tread portion due to centrifugal force and the through holes 4 are closed when the tire is rotated at a high speed. As a result, there is a risk that the effect of reducing the cavity resonance noise by the through holes 4 can not be obtained, or is lowered. On the contrary, the deformation of the plate-like members 21 and 22 can be suppressed by making the plate-like members 21 and 22 thick or hard, however, the weight is increased or the following performance to the deformation of the tire is obstructed. As a result, there is a risk that the other performances and the durability are adversely affected. According to the present invention, since the plate-like members 21 and 22 can be prevented from being crushed, by arranging the supporting member 3 between the two plate-like members 21 and 22, it is possible to reduce the cavity resonance noise not only at a low speed to a middle speed, but also at a high speed.

The supporting member 3 is preferably formed by a porous material. Accordingly, it is possible to obtain a sound absorbing effect of the supporting member 3 itself while suppressing the increase of the weight by the supporting member 3. Here, the porous material is constructed, for example, by a sponge and an unwoven fabric. The porous material is not limited to them, however, a sponge made of a soft polyurethane foam is preferably employed. Further, in the case that the unwoven fabric is employed as the porous material, the supporting member 3 is formed by rounding or folding the unwoven fabric.

The supporting member 3 according to the present embodiment is formed into a tubular shape which extends along the tire width direction WD. In the case that the supporting member 3 is formed into the tubular shape, an air layer is formed in an inner portion. As a result, the effect of absorbing the sound passing through the supporting member 3 made of the porous material is enhanced. However, the shape of the supporting member 3 is not particularly limited as long as the shape is the one which can support the plate-like members 21 and 22 against the centrifugal force, and a solid columnar shape may be employed. Further, the supporting member 3 does not necessarily support a whole, in the tire width direction, of the plate-like members 21 and 22, but may be formed into a shape which can support at least a part of the plate-like members 21 and 22. Further, the supporting member 3 may be formed into a shape which extends along the tire width direction WD beyond the width in the tire width direction WD of the plate-like members 21 and 22.

Further, a cylindrical shape is particularly preferable for the shape of the supporting member 3. In the case that the supporting member 3 is formed into the cylindrical shape, the sound absorbing effect can be achieved in relation to the sound from every angle. However, the cross-sectional shape of the supporting member 3 may be formed into polygonal shapes such as a triangular shape and a quadrangular shape, in addition to the circular shape.

The supporting member 3 is preferably sandwiched by the plate-like member 21 and the plate-like member 22. In the case that the supporting member 3 is formed by the porous material as mentioned above, the supporting member 3 may be inserted between the two plate-like members 21 and 22 between the adhesion portion 2a and the adhesion portion 2b which are adjacent to each other in a state in which the supporting member 3 is compressed.

A thickness of each of the plate-like members 21 and 22 is preferably between 0.1 and 10 mm, and more preferably between 0.2 and 1 mm. In the case that the thickness of the plate-like members 21 and 22 is made thinner than 0.1 mm, the effect of reducing the cavity resonance noise by the plate-like members 21 and 22 becomes small. On the contrary, in the case that the thickness of the plate-like members 21 and 22 is made thicker than 10 mm, the inner surface 13a of the tread portion is locally increased its weight by the plate-like members 21 and 22. As a result, there is a tendency that the high-speed uniformity is deteriorated, and a vibration and a ride quality caused thereby are deteriorated.

The maximum height Hp of the plate-like members 21 and 22 from the inner surface 13a of the tread portion in a tire equator is preferably equal to or more than one tenths of the tire cross-sectional height H (or 10 mm). In the case that the maximum height Hp of the plate-like members 21 and 22 is made lower than one tenths of the tire cross-sectional height H (or 10 mm), the effect of reducing the cavity resonance noise by the plate-like members 21 and 22 becomes small. On the contrary, the maximum height Hp of the plate-like members 21 and 22 is preferably equal to or less than one half of the tire cross-sectional height H. In the case that the maximum height Hp of the plate-like members 21 and 22 is made higher than one half of the tire cross-sectional height H, there is a risk that the plate-like members 21 and 22 comes into contact with the rim flange at a time of assembling in the rim and a malfunction may be caused.

A width Wp in the tire width direction of the plate-like members 21 and 22 is preferably between 30 and 120% of a ground width W. In the case that the width Wp of the plate-like members 21 and 22 is made smaller than 30% of the ground with W, the effect of reducing the cavity resonance noise becomes small. On the contrary, in the case that the width Wp of the plate-like members 21 and 22 is made larger than 120% of the ground width W, there is a risk that the plate-like members 21 and 22 come into contact with the inner surface of the side wall due to the deformation at the grounding time and the following performance to the curved surface is deteriorated. Therefore, the malfunction may be caused.

Although a length Lp in the tire circumferential direction of the plate-like members 21 and 22 is preferably equal to or less than the ground length, and is preferably about one half thereof, it is not limited thereto depending on the mounting number and the tire size. The length Lp in the tire circumferential direction of the plate-like members 21 and 22 is preferably in a size that partially overlaps with the ground length for covering the ground portion in stepping in and kicking out.

Figure 4:
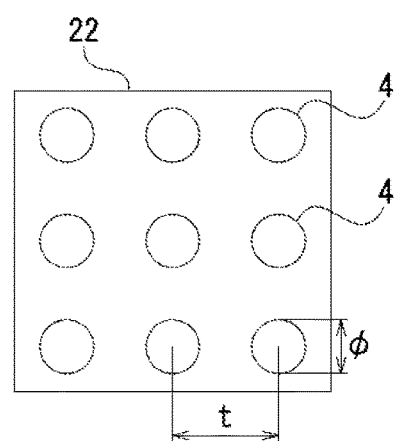
FIG. 4 is a plan view of the plate-like member.

FIG. 4 is a plan view showing a state in which a part of the plate-like member 22 is expanded into a plane shape. A hole diameter $\phi$ of the through hole 4 is preferably between 0.4 and 10 mm, and is more preferably between 1 and 5 mm. In the case that the hole diameter $\phi$ is smaller than 0.4 mm, the resistance when the sound and the air pass through becomes too large. As a result, it is hard to produce the through hole as well as the through hole is not effective. On the contrary, in the case that the hole diameter $\phi$ is larger than 10 mm, the resistance when the sound and the air pass through becomes too small. As a result, the damping effect becomes small.

Further, a hole area rate P is preferably between 1 and 20%, and more preferably between 1 and 10%. In the case that the hole area rate P is smaller than 1%, the resistance when the sound and the air pass through becomes too large. As a result, the hole is not effective. On the contrary, in the case that the hole area rate P is larger than 20%, the resistance when the sound and the air pass through becomes too small. As a result, the damping effect becomes small. On the assumption that a hole distance between the through holes 4 is t, the hole area rate P in the case that a plurality of through holes 4 is arranged in parallel vertically and laterally such as the present embodiment is defined by an formula $P=(\pi \times \phi^2)/(4 \times t^2)$. For example, on the assumption that the hole diameter ϕ is 3 mm and the hole distance t is 10 mm, the hole area rate P is about 7%.

The hole distance t between the through holes 4 can be appropriately set by the hole area rate P and the hole diameter ϕ while using the formula mentioned above, however, the hole distance t is preferably between 1 and 30 mm and is more preferably between 5 and 15 mm, for example. In the case that the hole distance t is smaller than 1 mm, the number of the holes is necessarily increased. As a result, the resistance when the sound and the air pass through becomes too small, the damping effect becomes small, and a strength of the plate itself is further reduced. On the contrary, in the case that the hole distance t is larger than 30 mm, the number of the holes is necessarily reduced, and the obtained damping effect becomes small.

The plate-like members 21 and 22 are formed by a plate-like or film-like resin. As the resin, general-purpose resins such as PET, PU, TPU, PVC, PC and PEN can be exemplified.

Figure 5:
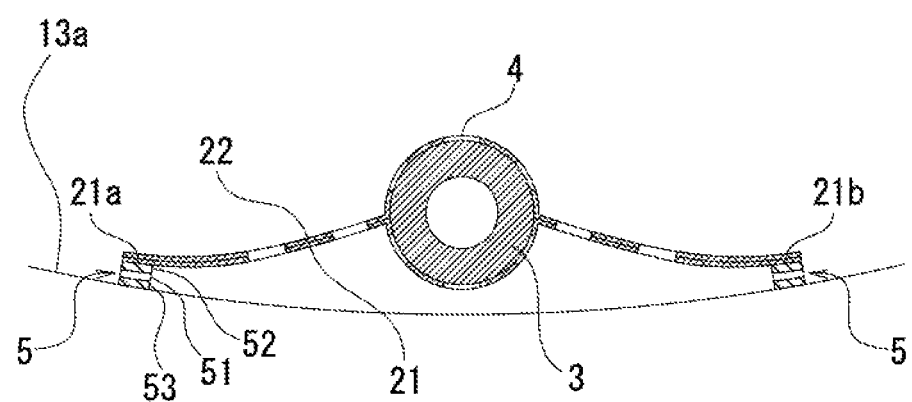
FIG. 5 is a cross-sectional view in the tire circumferential direction of a pneumatic tire according to the other embodiment.

The plate-like member 21 is attached to the inner surface 13*a* of the tread portion by the mounting portions 21*a* and 21*b*. The plate-like member 21 is fixed to the inner surface 13*a* of the tread portion by an adhesive agent or a double-stick tape. At this time, the plate-like member 21 is preferably fixed to the inner surface 13*a* of the tread portion via a cushion layer 5, as shown in FIG. 5. The cushion layer 5 is constructed by a cushion layer main body 51 having a stretching property, and double-stick tapes 52 and 53 in both sides of the cushion layer main body 51. Accordingly, the cushion layer main body 51 in the cushion layer 5 is deformed, and can follow the shape of the curved surface of the inner surface 13*a* of the tread portion and the deformation at the grounding time. As a result, it is possible to stably fix the plate-like member 21 to the inner surface 13*a* of the tread portion.

The total weight of the plate-like members 21 and 22 is preferably equal to or less than 15 g, and more preferably equal to or less than 10 g. The weight of the plate-like members 21 and 22 locally increases the weight of the inner surface 13*a* of the tread portion, and tends to deteriorate a high-speed uniformity and increase the vibration caused thereby and the ride quality. In the case that the cushion layer 5 described above is provided, a total weight including the plate-like members 21 and 22, the supporting member 3 and the cushion layer 5 is preferably set to be equal to or less than 20 g, and more preferably set to be equal to or less than 15 g.

Second Embodiment

Figure 6:
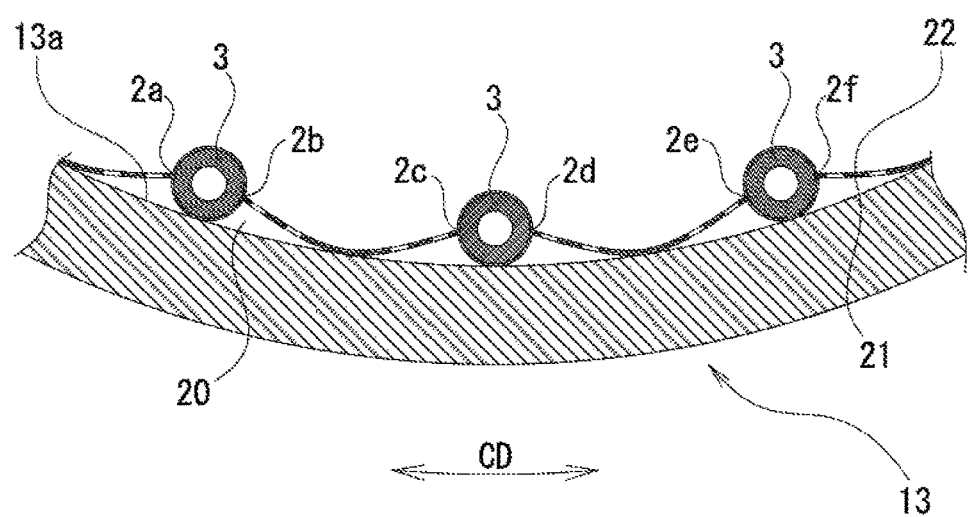
FIG. 6 is a cross-sectional view in the tire circumferential direction of a pneumatic tire according to the other embodiment.

In the first embodiment described above, there is shown the example which is provided with two plate-like members 21 and 22 having a plurality of through holes 4 formed therein and adhered to each other by adhesion portions 2*a* and 2*b* at two positions spaced apart from each other, and in which one supporting member 3 is inserted between the two plate-like members 21 and 22 between the adjacent adhesion portions 2*a* and 2*b*. However, as shown in FIG. 6, the two plate-like members 21 and 22 may be adhered to each other by adhesion portions 2*a*, 2*b*, 2*c*, 2*d*, 2*e*, 2*f*, . . . at three or more positions which are spaced apart from one another at uniform intervals, the supporting members 3 may be respectively inserted between the two plate-like members 21 and 22 between the adjacent adhesion portions 2*a*, 2*b*, 2*c*, 2*d*, 2*e*, 2*f*, . . . , and the two plate-like members 21 and 22 may be attached to the inner surface 13*a* of the tread portion over a whole periphery.

[Method of Manufacturing Pneumatic Tire]

Next, a description will be given of a method of manufacturing the pneumatic tire. The method of manufacturing the pneumatic tire according to the present invention includes an adhesion step of adhering the two plate-like members, which are overlapped, to each other by adhesion portions at least at two positions which are spaced apart from each other, a punching step of forming a plurality of through holes in two plate-like members, an insertion step of inserting a supporting member between the two plate-like members between the adjacent adhesion portions, and an attachment step of attaching a part of an outer surface of one of the two plate-like members to an inner surface of a tread portion so that a space is formed between the outer surface of one of two adhered plate-like members and the inner surface of the tread portion.

FIGS. 7A to 7F are schematic views showing the manufacturing step.

Figure 7A:
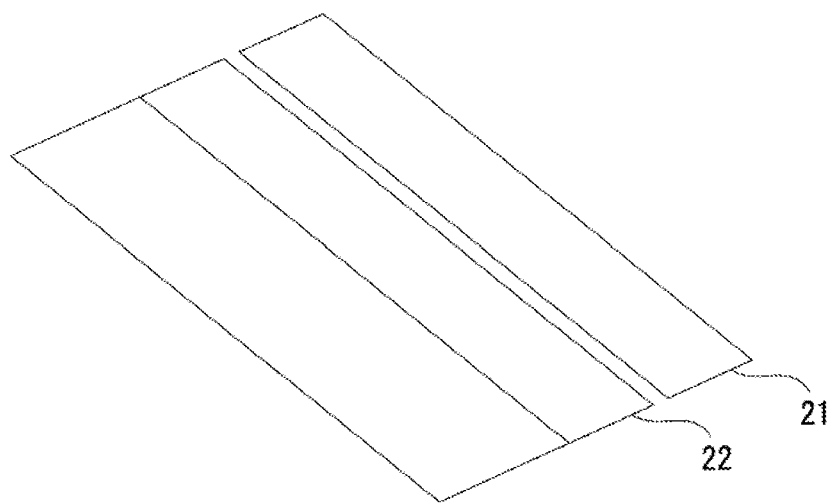
FIG. 7A is a schematic view showing a method of manufacturing a pneumatic tire.

First of all, long plate-like members 21 and 22 are formed by cutting a film made of a thermoplastic polyurethane having a rectangular plate shape, as shown in FIG. 7A.

Figure 7B:
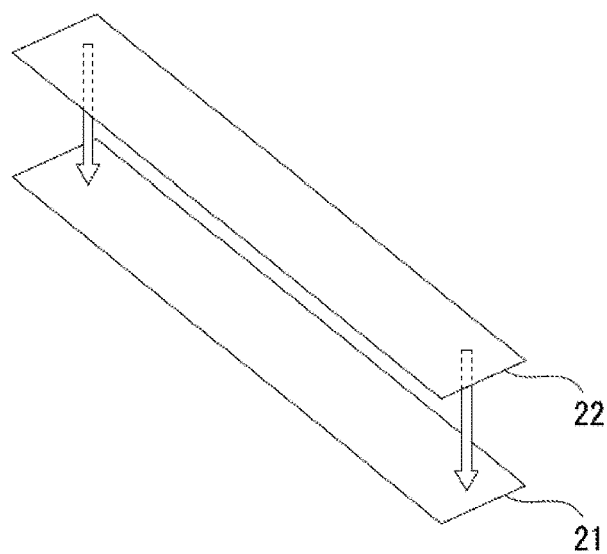
FIG. 7B is a schematic view showing the method of manufacturing the pneumatic tire.

Next, the two plate-like members 21 and 22 are overlapped as shown in FIG. 7B.

Figure 7C:
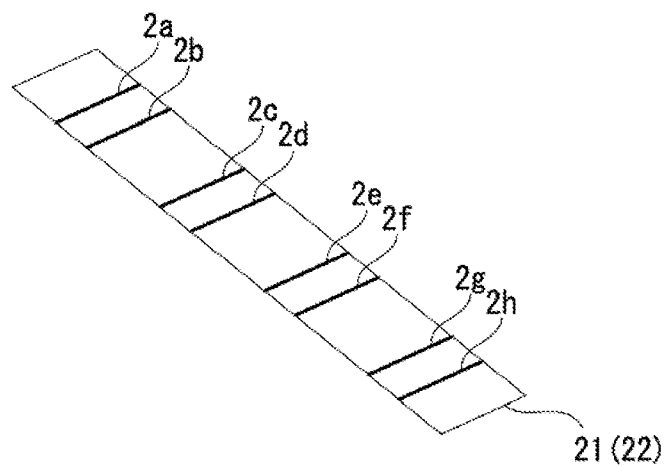
FIG. 7C is a schematic view showing the method of manufacturing the pneumatic tire.

Next, the two plate-like members 21 and 22 having been overlapped are adhered by adhesion portions at least at two positions which are spaced apart from each other, as shown in FIG. 7C. In the present embodiment, the plate-like members are adhered by adhesion portions 2*a* to 2*h* at eight positions. The adhesion portions 2*a* to 2*h* are thermally deposited, for example, by a welder process.

Figure 7D:
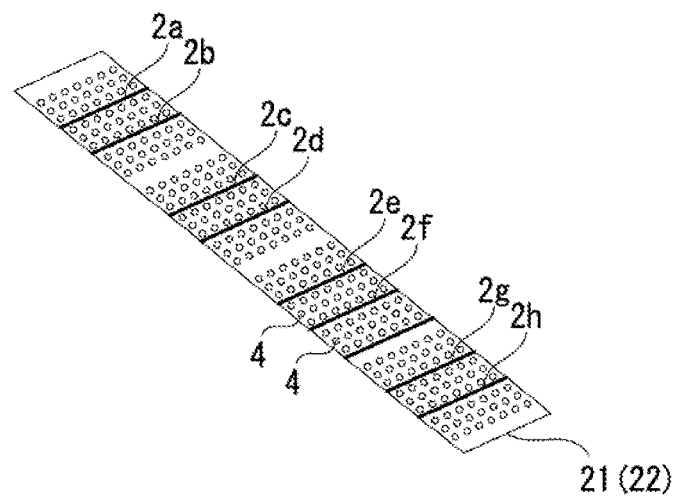
FIG. 7D is a schematic view showing the method of manufacturing the pneumatic tire.

Next, a plurality of through holes 4 is formed in the two plate-like members 21 and 22 according to a punching process, as shown in FIG. 7D. The through holes 4 are formed while avoiding the adhesion portions 2*a* to 2*h*, for keeping the strength of the plate-like members 21 and 22.

Figure 7E:
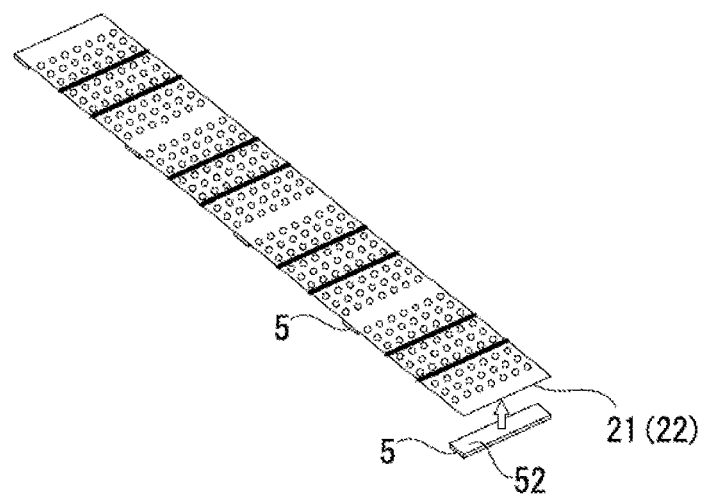
FIG. 7E is a schematic view showing the method of manufacturing the pneumatic tire.

Next, the cushion layer 5 is attached to one plate-like member 21 among the two plate-like members 21 and 22 by a double-stick tape 52, as shown in FIG. 7E.

Figure 7F:
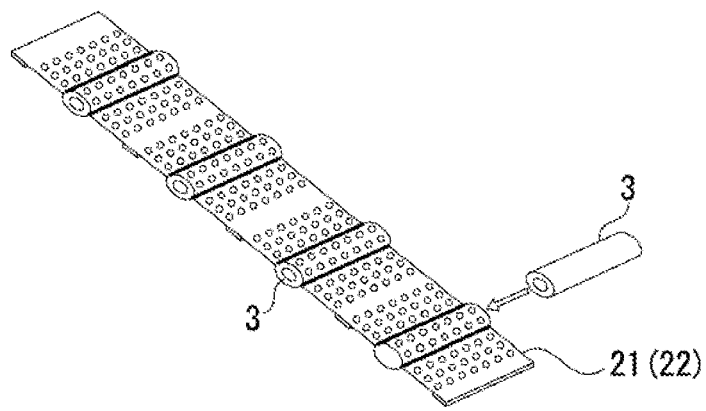
FIG. 7F is a schematic view showing the method of manufacturing the pneumatic tire.

Next, the supporting members 3 are respectively inserted between the two plate-like members 21 and 22 between two adjacent adhesion portions, as shown in FIG. 7F.

Finally, the plate-like members 21 and 22 are attached to the inner surface 13*a* of the tread portion by a double-stick tape 53 so that the space 20 is formed between the outer surface of the plate-like member 21 and the inner surface 13*a* of the tread portion.

Other Embodiments (1) In the embodiment described above, the through holes 4 of the plate-like member 21 and the through holes 4 of the plate-like member 22 have the same positions by simultaneously forming the through holes 4 in relation to the two plate-like members 21 and 22 that are overlapped, however, the positions of the through holes 4 formed respectively in the two plate-like members 21 and 22 may be different from each other.

(2) The adjacent adhesion portions for adhering the two plate-like members 21 and 22 are not necessarily arranged along the tire circumferential direction CD. For example, the adjacent adhesion portions may be arranged along the tire width direction WD.

(3) In the example shown in FIG. 2B, the outer surface of the plate-like member 21 positioned in the outer side in the tire diametrical direction of the supporting member 3 comes into contact with the inner surface 13*a* of the tread portion, however, it is preferable that the outer surface of the plate-like member 21 is not in contact with the inner surface 13a of the tread portion (refer to FIG. 5).

(4) In the embodiment described above, the adhesion step is carried out before the punching step, however, the punching step may be carried out before the adhesion step.

(5) In the embodiment described above, the long plate-like members 21 and 22 are used after being formed by cutting the rectangular plate shaped film, however, the long plate-like members 21 and 22 previously wound up to a roll may be used while being continuously reeled out of the roll. Further, the long plate-like members 21 and 22 having the supporting members 3 inserted thereinto may be temporarily wound up to the roll, and the long plate-like members 21 and 22 may be cut in correspondence to a tire size when being attached to the inner surface 13a of the tread portion.

(6) The shape of the supporting member 3 is not limited to the shape mentioned above. For example, the shape may be a solid circular cylinder shape or a solid square post shape.

Figure 8:
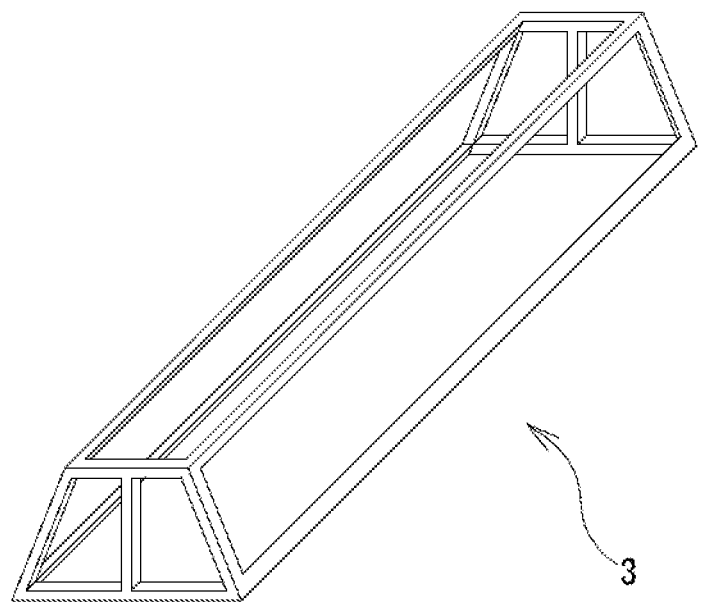
FIG. 8 is a perspective view of a supporting member according to the other embodiment.

(7) Further, the supporting member 3 is not necessarily formed by the porous material. For example, the supporting member 3 may be formed by the resin frame as shown in FIG. 8. As the resin, there can be exemplified the general-purpose resins such as PET, PU, TPU, PVC, PC, PE and PEN. The shape of the frame is not limited to the trapezoidal cross section as shown in FIG. 8, but may be a triangular cross section or a rectangular cross section.

What is claimed is:

1. A pneumatic tire comprising:
    two plate-like members which have a plurality of through holes formed therein, and are adhered to each other by adhesion portions at least at two positions spaced apart from each other; and
    a supporting member which is inserted between the two plate-like members between the adhesion portions being adjacent to each other,
    wherein a part of an outer surface of one of the two plate-like members is attached to an inner surface of a tread portion so that a space is formed between the outer surface of the one of the two plate-like members that are adhered and the inner surface of the tread portion.

2. The pneumatic tire according to claim 1, wherein the adhesion portions at the two positions are arranged along a tire circumferential direction.

3. The pneumatic tire according to claim 1, wherein the outer surface of the one of the two plate-like members is attached to the inner surface of the tread portion in a portion which is closer to an outer side than to the adhesion portions at the two positions.

4. The pneumatic tire according to claim 1, wherein
    the two plate-like members are adhered to each other at the adhesion portions at three or more positions which are spaced apart from one another at uniform intervals, and the supporting members are respectively inserted between the two plate-like members between the adjacent adhesion portions, and
    the two plate-like members are attached to the inner surface of the tread portion over its whole periphery.

5. The pneumatic tire according to claim 1, wherein the supporting member is in a tubular shape, a solid circular cylinder shape or a solid square post shape, which extends along a tire width direction.

6. The pneumatic tire according to claim 1, wherein the supporting member is in a frame shape having a trapezoidal cross section, a triangular cross section or a rectangular cross section, which extends along a tire width direction.

7. A method of manufacturing a pneumatic tire, the method comprising:
    an adhesion step of adhering two plate-like members, which are overlapped, to each other by adhesion portions at least at two positions which are spaced apart from each other;
    a punching step of forming a plurality of through holes in the two plate-like members;
    an insertion step of inserting a supporting member between the two plate-like members between the adjacent adhesion portions; and
    an attachment step of attaching a part of an outer surface of one of the two plate-like members to an inner surface of a tread portion so that a space is formed between the outer surface of the one of the adhered two plate-like members and the inner surface of the tread portion.

8. The method of manufacturing the pneumatic tire according to claim 7, wherein the adhesion step is carried out before the punching step.

9. The method of manufacturing the pneumatic tire according to claim 7, wherein
    the two plate-like members are two long plate-like members which are supplied continuously,
    the two plate-like members are adhered to each other by the adhesion portions at three or more positions which are spaced apart from one another in a longitudinal direction, in the adhesion step;
    the supporting members are inserted respectively between the two plate-like members between the adhesion portions which are adjacent to each other, in the insertion step; and
    the adhered two plate-like members are attached to the inner surface of the tread portion over its whole periphery, in the attachment step.

\* \* \* \* \*